April 4, 1944. H. M. OWENS 2,345,683
JUICE EXTRACTING MACHINE
Filed Nov. 7, 1941 4 Sheets-Sheet 1
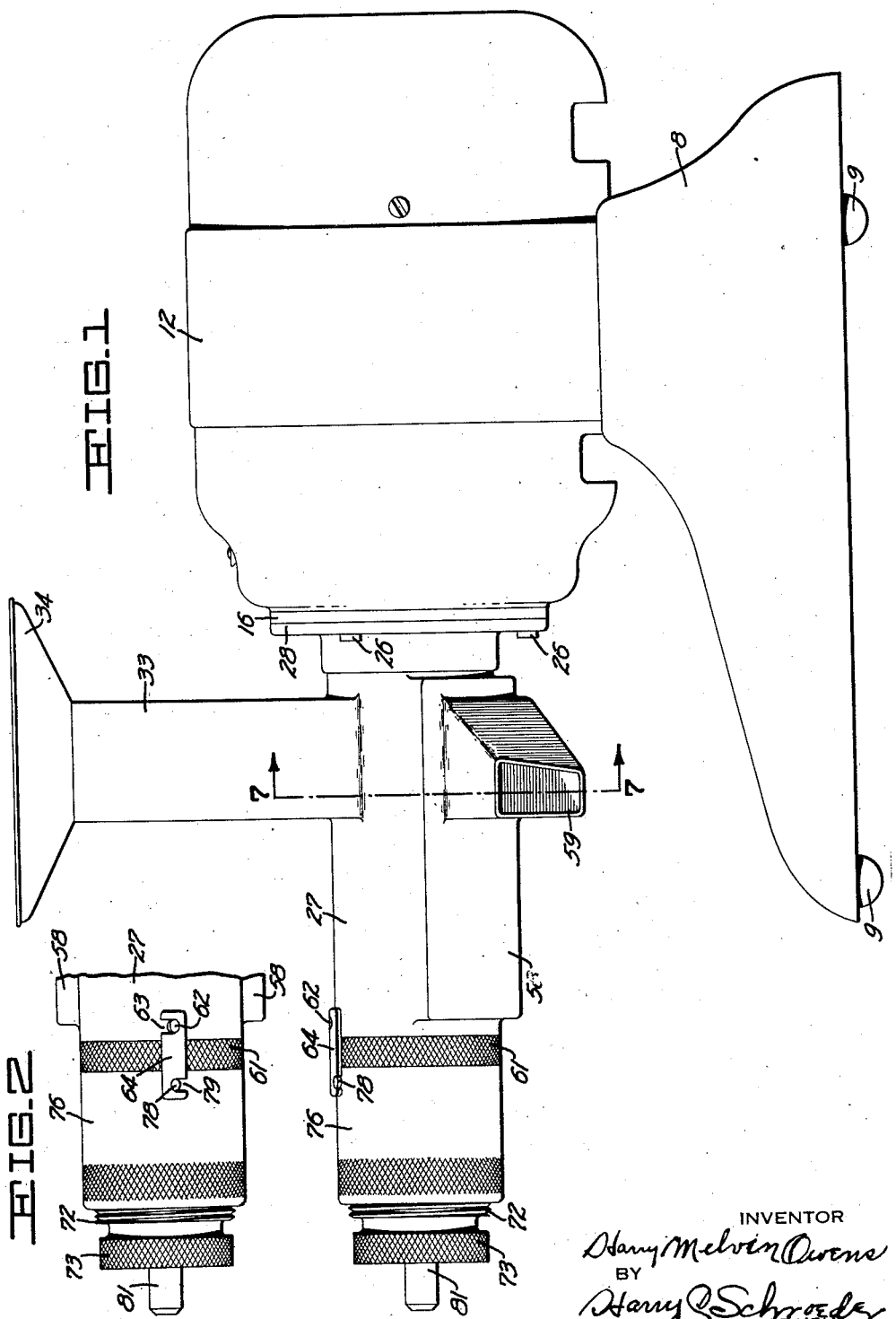

April 4, 1944. H. M. OWENS 2,345,683
JUICE EXTRACTING MACHINE
Filed Nov. 7, 1941 4 Sheets-Sheet 2
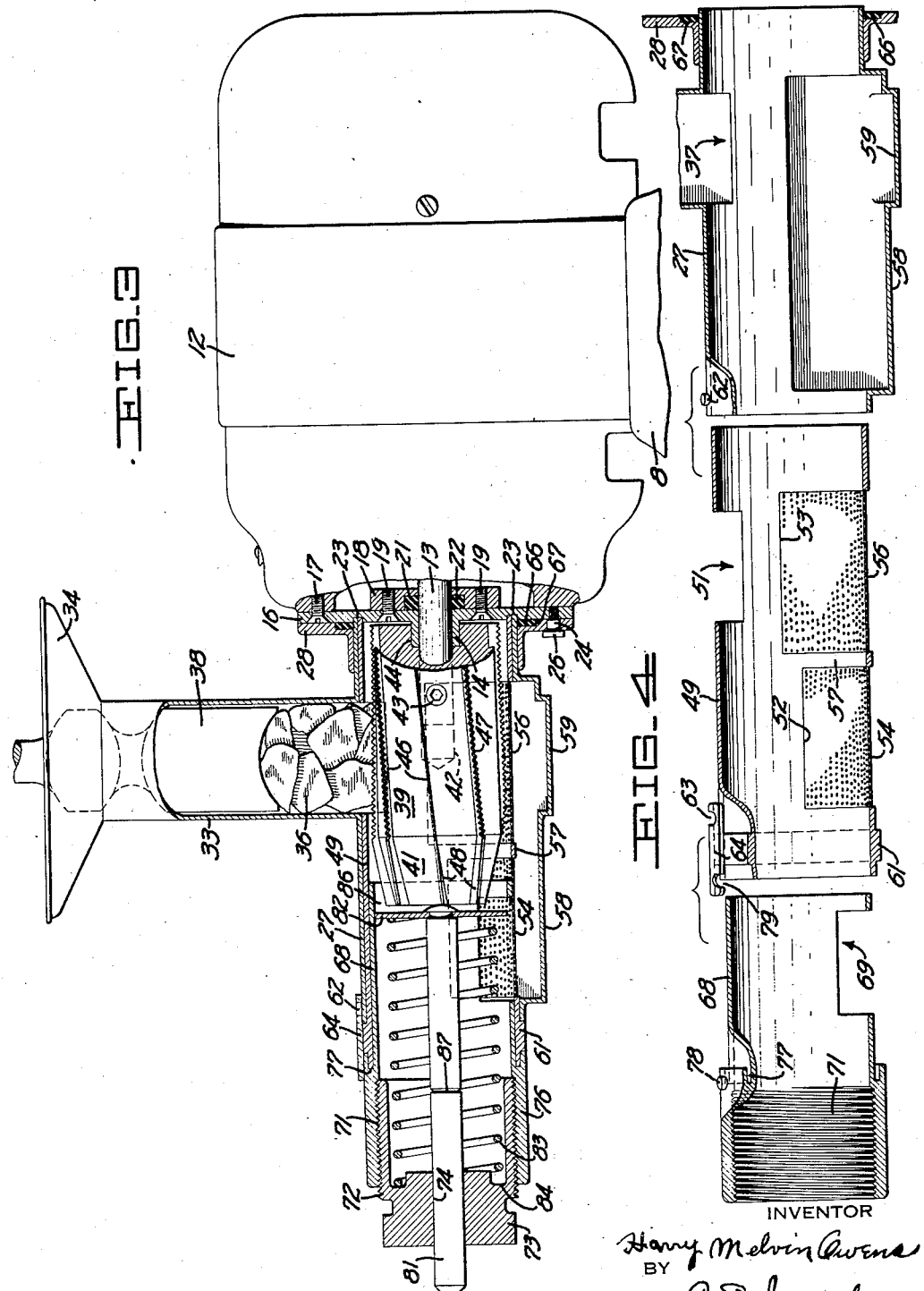
INVENTOR
Harry Melvin Owens
BY Harry C. Schroeder
ATTORNEY

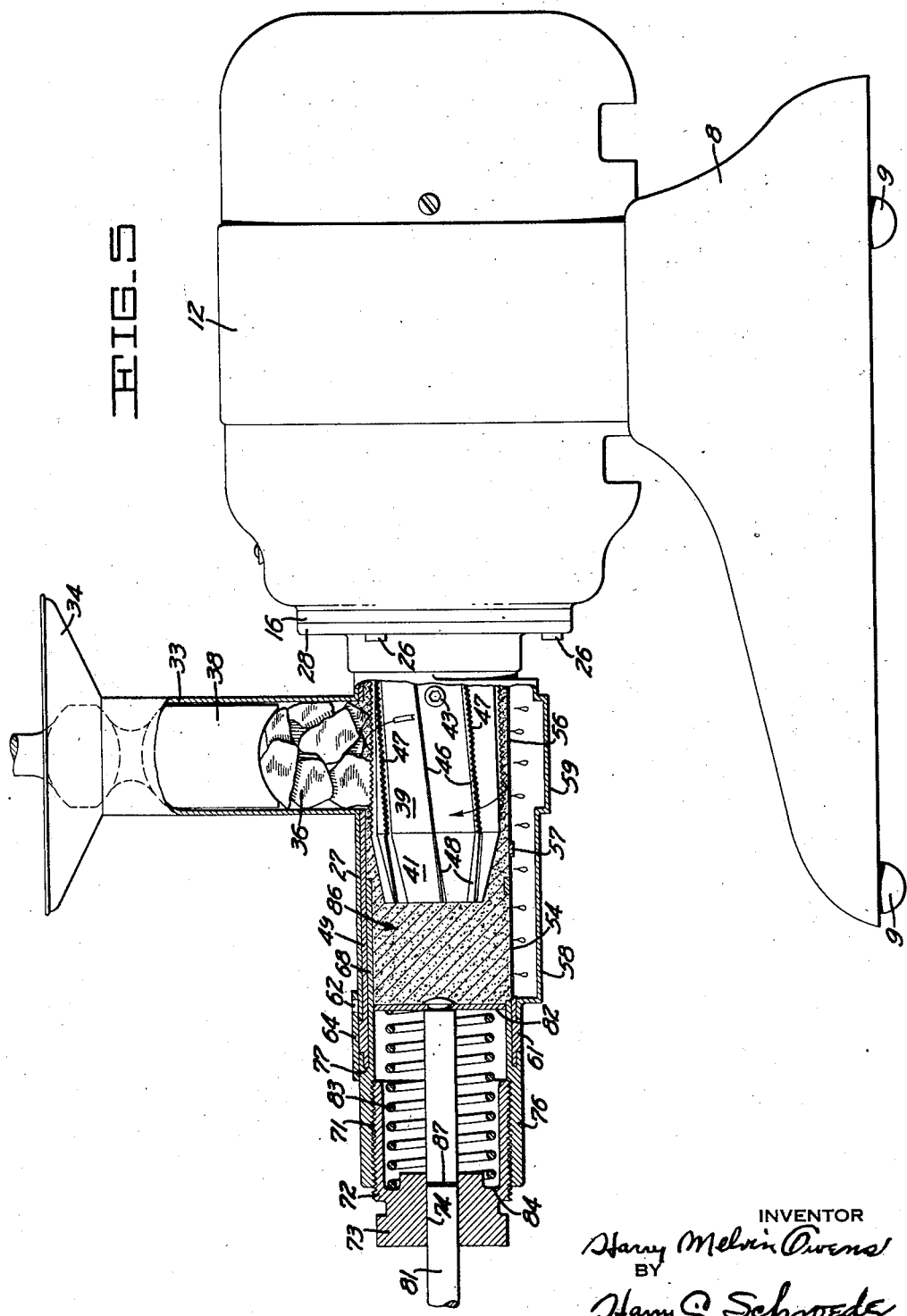

April 4, 1944. H. M. OWENS 2,345,683
JUICE EXTRACTING MACHINE
Filed Nov. 7, 1941 4 Sheets-Sheet 4
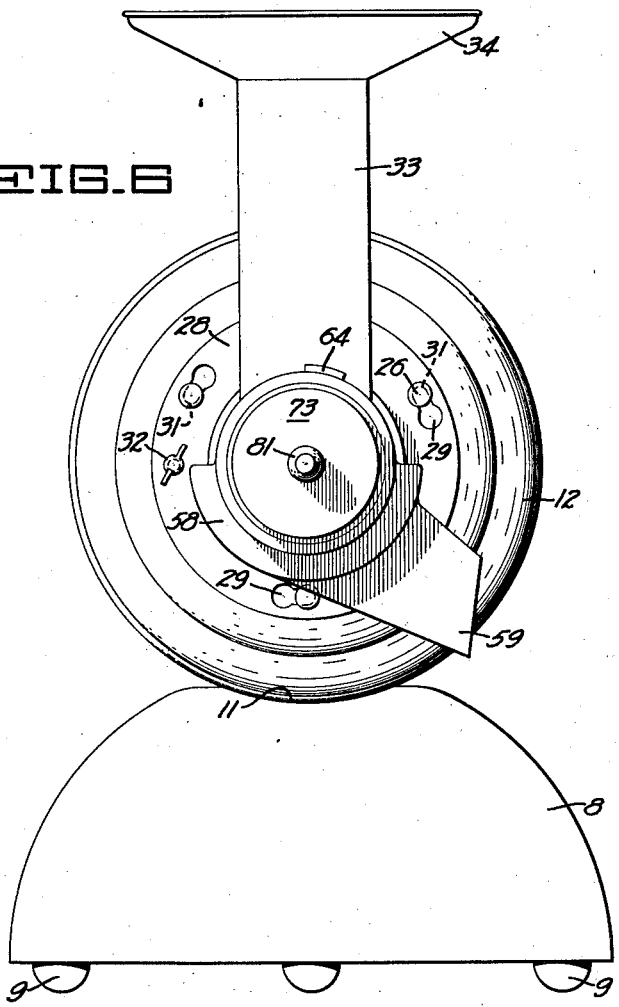
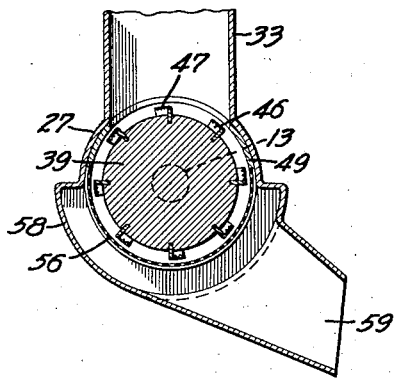
INVENTOR
Harry Melvin Owens
BY
Harry C. Schroeder
ATTORNEY Patented Apr. 4, 1944

2,345,683

UNITED STATES PATENT OFFICE 2,345,683

JUICE EXTRACTING MACHINE

Harry M. Owens, Oakland, Calif., assignor to Susan Jane Owens, Oakland, Calif.

Application November 7, 1941, Serial No. 418,150

2 Claims. (Cl. 100—48)

This invention relates to improvements in mechanisms for extracting juices from fruits or vegetables.

It is an object of the invention to provide a machine of the character described which is capable of thoroughly extracting juices from fruits or vegetables possessing only a small proportion of liquid.

Another object of the invention is to provide a machine of the class referred to which performs, in a compacted space, the successive functions of comminuting the fruit or vegetable, subjecting the resulting pulp to centrifugal force to extract some of the juice and then subjecting the pulp to a compressive force to further extract juice therefrom.

A further object of the invention is to provide a machine of the character described whose plurality of parts may be instantly detached one from the other for cleaning.

Still another object of the invention is to provide a juice extracting machine capable of producing a beverage product containing a negligible amount of pulp.

An additional object of the invention is to provide, in a juice extracting machine of the character described and operative while the machine is in use, means for selectively varying the pressure applied to the pulp in the operation of extracting the juice therefrom.

Yet another object of the invention is to provide, in a machine of the character referred to, a quickly detachable receiver by means of which quantities of pulp, which have been exhausted of their liquid content, may be periodically removed from the machine.

The invention possesses other objects and features of advantage which, together with the foregoing, will be specifically brought forth in the detailed description of the preferred form of the invention hereunto annexed. It is to be understood that the invention is not to be limited to the particular form thereof herein shown and described as various other embodiments thereof may be employed within the scope of the appended claims.

Referring to the drawings:

Figure 1 is a side elevational view of the complete juice extracting machine of my invention.

Figure 2 is a fragmental top plan view, of a portion of the structure of Figure 1, showing the lock for retaining parts of the apparatus in position.

Figure 3 is a view, partly in side elevation and partly in vertical section, of the machine. Portions of the view are broken away so as to conserve space in the drawing.

Figure 4 is a vertical sectional view taken through the three axially spaced tubular members forming the press assembly. The members are bracketed to indicate a unitary view.

Figure 5 is a view, similar to Figure 3, showing the positions of certain of the parts during the juice extraction process.

Figure 6 is an end elevational view of the machine.

Figure 7 is a vertical sectional view taken in the plane indicated by the line 7—7 of Figure 1.

Broadly, the extractor of my invention comprises a comminuting chamber, into which may be forced, through a suitable feed spout, the material from which the juice is to be extracted. Within the chamber is a high speed rotor having toothed cutter vanes which disintegrate the material into tiny fragments thus breaking up most of the juice cells. Centrifugal force imposed on the fragmented material by the cutter vanes causes the free juice to be forced through a foraminated portion of the wall provided in the comminuting chamber and to flow into a discharge spout. The position of the toothed cutter vanes relative to the rotor is such that an impelling force, in a different direction from that of the centrifugal force, will be imposed on the fragmented material causing the latter to be ejected from the comminuting chamber into a coextensive pulp chamber. The pulp chamber has therein a pressure-controlled element which may recede as pulp is forced into the chamber thereby gradually enlarging the volume of the chamber to accommodate the entering pulp and simultaneously applying a compressive force to the pulp to further squeeze juice therefrom, which then flows through foraminated wall section of the pulp chamber and is thereafter conducted into the discharge spout. Means is provided for selectively varying the force with which the pressure-controlled element compresses the pulp so that satisfactory extraction of the juice from various materials may be obtained depending upon the liquid content of the latter. Means is provided which indicates when the pulp chamber is full and means is also provided for removing the pulp in a unitary mass from the pulp chamber.

In greater detail, the machine comprises a base 8 provided with a plurality of rubber supporting feet 9 and having in its upper surface a concave saddle 11 in which the housing 12 of a high-speed drive motor is mounted by internal screws not shown. The motor is provided with a rotatable drive shaft 13 projecting from one end thereof through a hub 14 formed centrally of an end plate 16 secured to the end of the motor housing 12 by screws 17. A centrally apertured gland block 18, through which the drive shaft 13 passes, is secured to a side of the end plate 16, within the motor housing, by screws 19 and has therein a circular recess 21 containing a packing ring 22 which prevents leakage of fluid from the comminution chamber into the motor housing as will be seen later.

The outer face of the end plate 16 is also provided with a concentric sealing groove 23 and with a plurality, preferably three, of mounting studs each of which has a stem 24 smaller in diameter than its head 26, the latter being spaced, axially of the stem, from the surface of the end plate.

Positioned concentrically of the end plate 16, and having an end thereof entering the sealing groove 23, is a tubular extractor housing 27 provided with a mounting flange 28 adapted to lie contiguously against the exposed surface of the end plate 16. The flange 28 is provided, as is best shown in Figure 6, with a plurality of apertures 29 each of which has a radially extending notch 31 formed therewith. The heads 26 of the mounting studs are adapted to pass freely through the apertures 29 and, by slightly rotating the flange 28 relative to the end plate 16, the shanks 24 of the studs enter the notches thus securely locking the flange and end plate together. A winged locking screw 32 tapped through the flange 28 may be tightened against the face of the end plate, or caused to enter an aperture provided therein, so as to prevent accidental displacement of the flange and end plate which would release the mounting studs from the apertures 29. It will therefore be seen that the extractor housing 27 may be mounted on or detached from the end plate 16 with ease and great rapidity. Extending radially upwardly from the extractor housing 27 is a tubular feed spout 33, preferably rectangular in cross-sectional form, having a hopper 34 at its upper end, in which the material 36, from which the juice is to be extracted, may be placed and having at its lower end an opening 37, see Figure 4, through which the material 36 may be pushed, by a hand-manipulated ram 38 or other such implement, into the extractor housing 27.

Means is provided for comminuting the material 36 as it is pushed into the extractor housing 27, means is also provided for separating the resulting juice and pulp, and means is further provided for urging the pulp along the extractor housing so as to make way for the following material entering the extractor housing through the feed spout opening 37. Positioned concentrically within the extractor housing is a cylindrical rotor 39 having a frusto-conical end portion 41 and a central bore 42 in which is secured, by a setscrew 43 or in any other suitable manner, the motor drive shaft 13. A counterbore 44, formed at the outer end of the bore 43, admits the hub 14 of the end plate 16, to form a fluid seal as will be presently seen. The rotor 39 is provided with a plurality of circumferentially spaced grooves in which are secured cutter vanes 46, each having, in the portion thereof paralleling the cylindrical portion of the rotor, cutting teeth 47, and, in the portion thereof registering with the frusto-conical portion of the rotor, plain impeller vanes 48. As the material 36 emerges from the bottom end of the feed spout 33 and enters the extractor housing it is engaged by the sharp teeth 47 of the rapidly revolving rotor, which is rotating in a counter-clockwise direction as viewed in Figure 7, and torn into minute fragments thereby immediately rupturing most of the juice cells in the material and thoroughly breaking up the fibers into a fine pulp. It will be noted that each of the cutter and impeller vanes is positioned at a slight angle with respect to the axis of the rotor so that, when the rotor revolves, the comminuted material or pulp will be forcibly thrust toward the frusto-conical end 41 of the rotor.

Designed to be slid axially into the extractor housing 27 is a tubular strainer sleeve 49 having its inner end seated in the circular sealing groove 23 and with a radial opening 51 which registers with the end opening 37 of the feed spout. Diametrically opposite the opening 51 are axially spaced openings 52 and 53 in which are set sections of screen 54 and 56, the edges of the screens being soldered to the sides of the openings so as to fixedly mount the screens in the openings. While a single long opening could have been made instead of the double opening shown, the latter is preferable due to the danger of compressed material within the extractor housing bulging the single large screen radially outwardly. The band of metal 57 provided by forming the dual openings lends valuable reinforcement to the screens. The free juice, which results when the material is comminuted by the cutter vanes, passes partly due to gravity and partly due to centrifugal force created by the cutter vanes, downwardly through the strainer screen 56 into a drip chamber 58 formed in the bottom of, and extending substantially peripherally midway around, the extractor housing, the juice then flowing into a tubular discharge spout 59, which extends radially from the drip chamber, and thence into a suitable collecting vessel. A collar 61 formed integrally with and at an end of the strainer sleeve is adapted to engage the outer end of the extractor housing to form a stop limiting the degree of axial engagement of the sleeve and housing and a pin 62 mounted on and projecting radially from the extractor housing is adapted to be engaged by a notch 63 formed in one end of a locking bar 64 integrally secured to and extending transaxially of the collar 61. The position of the pin 62 is such that when the strainer sleeve is slid into the extractor housing and rotated to engage the notch 63 with the pin, the apertures 51, 54, and 56 will be positioned in their correct operating locations.

During comminution of the material 36 within the extractor housing considerable pressure will be generated in the juice and pulp therein sufficient to cause excessive leakage through ordinary joints. In order to properly seal the extractor housing against such leakage it is therefore necessary to provide tightly sealed joints. These I have provided in the packing ring 22, which prevents leakage of fluid along the shaft 13 into the motor housing 12, in the hub 14 extended into the counterbore 44 of the rotor which provides a baffle assisting to arrest such leakage, in the seating of the ends of the housing 27 and the strainer sleeve 49 in the circular recess 23, and in the provision of a rubber gasket 66 seated in a circular recess 67, formed in the face of the flange 28, which is compressed between the flange and the end plate 16. Thus the only possible outlets from the housing of the juice and pulp are axially of the housing or through the screens 54 and 56 into the drip chamber 58 and thence into the discharge spout 59.

Means is provided for receiving the pulp which is propelled, by the helical positioning of the cutter and impeller vanes 46 and 48, axially of the extractor housing. Designed to be telescopically slid into an end of the strainer sleeve is a tubular pulp cylinder 68 provided at one end with a rectangular aperture 69 which, when the cylinder is in place within the strainer sleeve, registers with the screen 54, and at the other end with internal screw threads 71 which receive a threaded pressure adjustment plug 72 having a knurled end portion 73, serving as a handwheel, and an axial bore 74. The outer end of the pulp cylinder is provided with a diametrically enlarged head 76 having a circumferential end groove 77 into which an end of the strainer sleeve 49 may extend so as to provide a fluid-tight seal at this point. The head 76 is also provided with a radially extending pin 78 which may enter a notch 79, formed in an extension of the locking bar 64, so that the pulp cylinder is securely locked to the strainer sleeve. It will be seen that only a slight rotational movement of either the head 76 of the pulp cylinder, or of the collar 61 of the strainer sleeve 49, is necessary to release the cylinder from the sleeve and the sleeve from the extractor housing and that the cylinder may then be axially withdrawn from the sleeve and the sleeve may also be withdrawn from the extractor housing. Slidably mounted in the axial bore 74, of pressure adjustment plug 72, is a rod 81 having secured to its inner end, within the extractor housing, a piston 82. A coiled compression spring 83, concentric with the rod 81, has its opposite ends engaging the piston 82 and the bottom of a recess 84 formed in the plug 72. The function of the spring 83 is to forcibly urge the piston toward the end of the rotor 39.

As the comminuted material 36, or pulp, is projected from the end of the rotor 39, it passes into the space between the end of the rotor and the face of the piston 82 which space may be aptly referred to as the pulp chamber 86. As more and more pulp enters the pulp chamber 86 it will force the piston 82 to recede against the pressure of the spring 83. This, of course, causes a compression of the pulp mass, axially of the extractor housing, so that any juice in the pulp will be squeezed therefrom and will pass through the screen 54 into the drip chamber 53. The squeezing of the pulp will continue, with gradually increasing pressure, as the piston 82 recedes and as the spring 83 is compressed. In order to indicate to the operator when the pulp completely fills the pulp cylinder 68, necessitating removal of the latter for emptying, I provide on the rod 74 a circumferential groove 87 which, when it becomes visible, to the operator, beyond the end of the end portion 73 of the plug 72, serves to provide such indication. The operator then removes the pulp cylinder and applies manual pressure axially to the rod 81 to cause ejection of the pulp into a waste receptacle after which the pulp cylinder is replaced and the operation of the machine is continued. By rotating the handwheel 73, so as to advance the plug 72 into the pulp cylinder, it will be seen that the spring 83 will be compressed thereby requiring a greater pressure on the pulp to cause the piston 82 to recede in the cylinder. This effects an increased squeezing pressure on the pump with the liberation of more juice therefrom. Of course, by advancing or retarding the plug 72, the spring pressure may be selectively varied to meet the requirements of the particular material being operated upon.

As the pulp first enters the pump chamber, immediately adjacent the end of the rotor, it may contain a large or small proportion of juice cells which have not been broken open by the cutter vane teeth 47. However, due to the presence of the impeller vanes 48, the mass of pulp will be caused to rotate rapidly as it enters the pulp chamber thereby creating an abrasive action to occur between the particles of material sufficient to rupture the greater portion of these juice cells. In addition, this rotation of the pulp mass in the zone thereof wherein the greatest proportion of entrapped juice is contained will produce torsional stress thereon simulating the wringing out of a wet cloth or mop by twisting it. It is thus possible to extract a materially greater proportion of juice from the pulp, by the combined axial pressure and torsional stress applied thereto, than could be expected if compression of the pulp alone was employed.

While the machine of my invention is capable of rapidly and thoroughly extracting juice from such watery fruits and vegetables as apples, tomatoes, celery, spinach, and the like, its efficiency of operation becomes quite prominent in the extraction of juice from root vegetables such as carrots and turnips. The reduction of these vegetables to a very fine pulp by the toothed cutter vanes, the agitation of the pulp to rupture the maximum number of the juice cells, and the following pressing of the pulp, all in a continuous operation performed in a very limited space, results in the extraction of a surprisingly large amount of juice from these vegetables popularly fancied to be quite low in juice content. Also, due to the thoroughness with which the cellular structure of the vegetable is broken down, the resulting juice contains a remarkably high percentage of the mineral values and vitamins of the parent material. Furthermore, the screens 54 and 56 are sufficiently fine as to prevent the passage therethrough of any noticeable amount of fiber, thereby producing a beverage which is distinguished by its clarity.

Having thus described my invention in detail, what I claim as new and desire to secure by Letters Patent is:

1. A juice extracting machine of the character described having in combination a housing provided with a macerating chamber having a perforated wall portion, a tubular drip chamber extending into the macerating chamber and detachably connected therewith, a tubular discharge member extending into said drip chamber and detachably connected therewith, a rotatively mounted macerating member extending into said drip chamber and having means for forcing residual pulp toward said discharge member, and means within the discharge member and movable along and in contact with said perforated wall for yieldingly resisting movement of the pulp under the pressure of said forcing means so as to apply a squeezing pressure to the pulp.

2. A juice extracting machine of the character described having in combination a housing provided with a macerating chamber having a perforated wall portion, a tubular drip chamber extending into the macerating chamber and detachably connected therewith, a tubular discharge member extending into said drip chamber and detachably connected therewith, a rotatively mounted macerating member extending into said drip chamber and having means for forcing residual pulp toward said discharge member, a plug removably closing the discharge end of said discharge member, a piston movable in said discharge member at a position to travel along and in contact with said perforated wall, and a pressure spring interposed between said plug and said piston so as to yieldingly resist movement of the pulp under the tension of said forcing means.

HARRY M. OWENS.